United States Patent [19]
Nakajima

[11] Patent Number: 5,836,158
[45] Date of Patent: Nov. 17, 1998

[54] AUTOMATIC CLUTCH DEVICE FOR HYDROSTATIC CONTINUOUSLY VARIABLE TRANSMISSION

[75] Inventor: Yoshihiro Nakajima, Wako, Japan

[73] Assignee: Honda Giken Kogyo Kabushiki Kaisha, Tokyo, Japan

[21] Appl. No.: 727,927

[22] Filed: Oct. 9, 1996

[30] Foreign Application Priority Data

Oct. 9, 1995 [JP] Japan .................................. 7-261682

[51] Int. Cl.$^6$ .............................................. F16D 31/02
[52] U.S. Cl. ............................. 60/436; 60/441; 60/468; 60/487
[58] Field of Search .............................. 60/468, 435, 436, 60/491, 487, 494

[56] References Cited

U.S. PATENT DOCUMENTS

| | | | |
|---|---|---|---|
| 3,153,900 | 10/1964 | Pigeroulet . | |
| 3,200,590 | 8/1965 | Summerlin . | |
| 4,317,331 | 3/1982 | Aruga . | |
| 4,598,545 | 7/1986 | Harada | 60/435 |
| 5,060,476 | 10/1991 | Yamaguchi et al. | 60/487 |
| 5,277,286 | 1/1994 | Yamamoto et al. | 60/468 X |
| 5,307,727 | 5/1994 | Berger et al. | 60/435 X |
| 5,325,670 | 7/1994 | Iino | 60/468 |
| 5,412,948 | 5/1995 | Komura et al. | 60/468 |
| 5,425,238 | 6/1995 | Takagi | 60/489 X |

FOREIGN PATENT DOCUMENTS

| | | |
|---|---|---|
| 0529657 | 3/1993 | European Pat. Off. . |
| 54-134252 | 10/1979 | Japan . |

*Primary Examiner*—Hoang Nguyen
*Attorney, Agent, or Firm*—Birch, Stewart, Kolasch & Birch, LLP

[57] ABSTRACT

A hydrostatic continuously variable transmission is provided in which a hydraulic pump and a hydraulic motor are communicated to each other through a low pressure oil passage and a high pressure oil passage and a clutch valve capable of releasing an oil pressure of the high pressure oil passage is connected to the high pressure oil passage. The clutch valve can be automatically operated by making use of an oil pressure of the low pressure oil passage. A clutch valve is applied with an oil pressure of a low pressure oil passage for biasing the clutch valve in a valve opening direction, and an oil pressure governor is connected to a supply oil passage for supplying an oil pressure from an oil supply pump to the low pressure oil passage through a check valve for increasing an oil pressure of the oil passage in accordance with an increase in an input rotational speed of a hydraulic pump.

22 Claims, 9 Drawing Sheets

AUTOMATIC CLUTCH DEVICE FOR HYDROSTATIC CONTINUOUSLY VARIABLE TRANSMISSION

BACKGROUND OF THE INVENTION

1. Field of the Invention

The present invention relates to an automatic clutch device for a hydrostatic continuously variable transmission in which a hydraulic pump and a hydraulic motor are in communication with each other through a low pressure oil passage and a high pressure oil passage. An oil supply passage is connected to an oil supply pump and is connected to the low pressure oil passage and the high pressure oil passage through a first check valve and a second check valve, respectively. A path between the hydraulic pump and the hydraulic motor is automatically controlled into an oil pressure transmission state or an oil pressure transmission cut-off state.

2. Description of Background Art

As set forth in Japanese Patent Publication No. Sho 61-23414, an automatic clutch device is known, which includes a clutch valve and an actuator connected to the clutch valve for automatically operating the clutch valve. More specifically, the clutch valve is provided in a short-circuiting oil passage connecting a low pressure oil passage and a high pressure oil passage to each other, for opening/closing the short-circuiting oil passage. The actuator is operated by an oil pressure generated by an oil pressure governor interlocked with rotation of a motor of a hydraulic pump.

The above automatic clutch device has a disadvantage in complicating and enlarging the structure and increasing the cost because it requires, in addition to a clutch valve, an actuator for operating the clutch valve.

SUMMARY AND OBJECTS OF THE INVENTION

An object of the present invention is to provide an automatic clutch device of the above-described hydrostatic continuously variable transmission, which is capable of solving the above-described disadvantage.

To achieve the above object, according to a first feature of the present invention, there is provided an automatic clutch device for a hydrostatic continuously variable transmission, which includes a clutch valve, provided between the high pressure oil passage and the low pressure oil passage or a discharge port connected to an oil reservoir, for switching a valve position between a valve opening position in which the high pressure oil passage and the low pressure oil passage or the discharge port connected to the oil reservoir are communicated to each other and a valve closing position in which they are cut-off from each other. The clutch valve is applied with oil pressure from the low pressure oil passage for biasing the clutch valve in the valve closing direction. An oil pressure governor is provided for increasing the oil pressure of the low pressure oil passage applied to the clutch valve linearly with an input rotational speed of the hydraulic pump, the oil pressure governor is connected to the clutch valve.

According to a second feature of the present invention, in addition to the first feature, the clutch valve is applied with oil pressure of the high pressure oil passage in the valve opening direction when the clutch valve is closed. In addition, the clutch valve is opened when the oil pressure of the high pressure oil passage is increased to exceed the oil pressure of the low pressure oil passage by a specified value or more.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of the present invention will be described with reference to the drawings.

Figure 1:
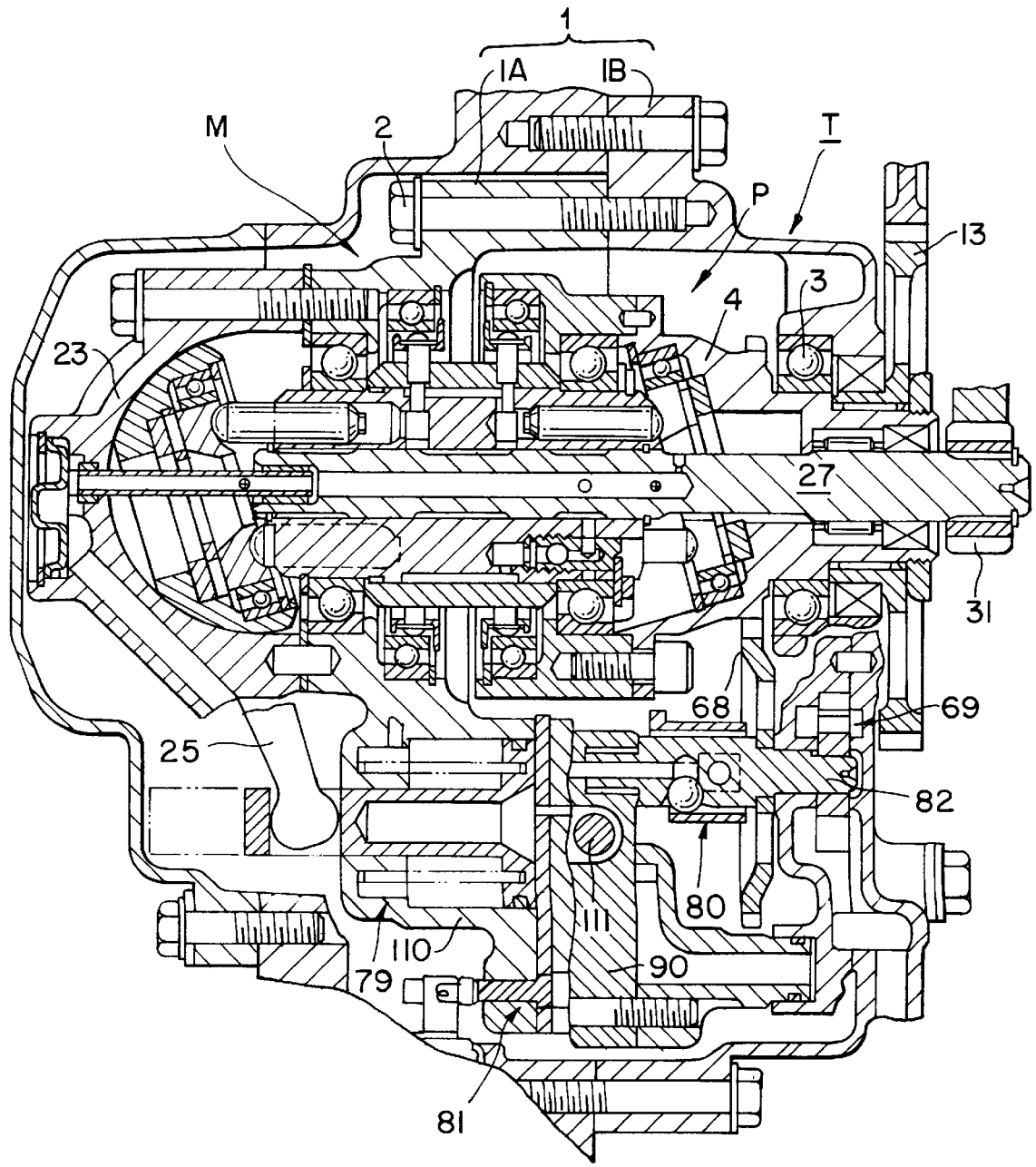
FIG. 1 is a vertical sectional view of a hydrostatic continuously variable transmission for a motorcycle according to one embodiment of the present invention.
Figure 2:
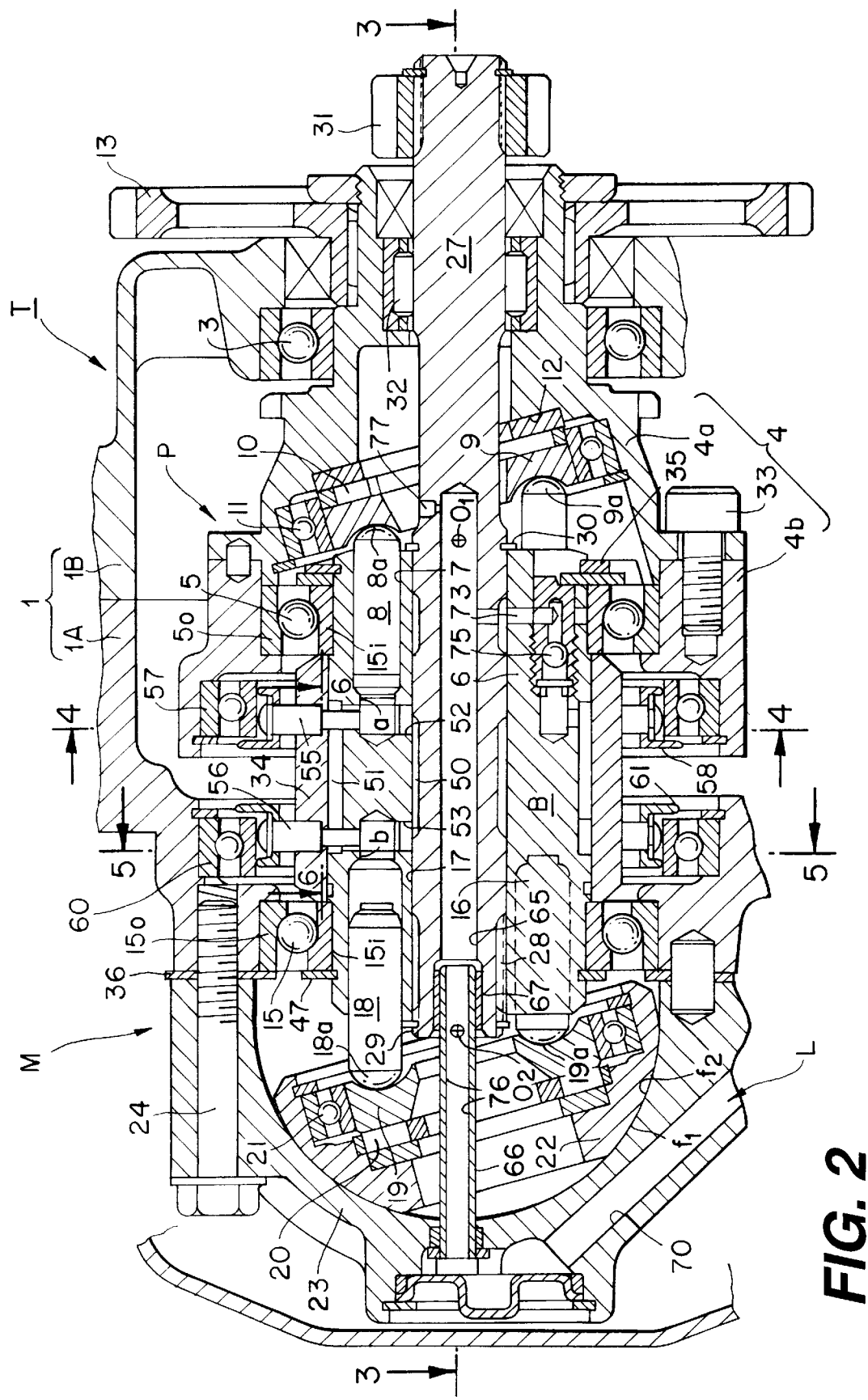
FIG. 2 is an enlarged view of an essential portion of FIG. 1.
Figure 3:
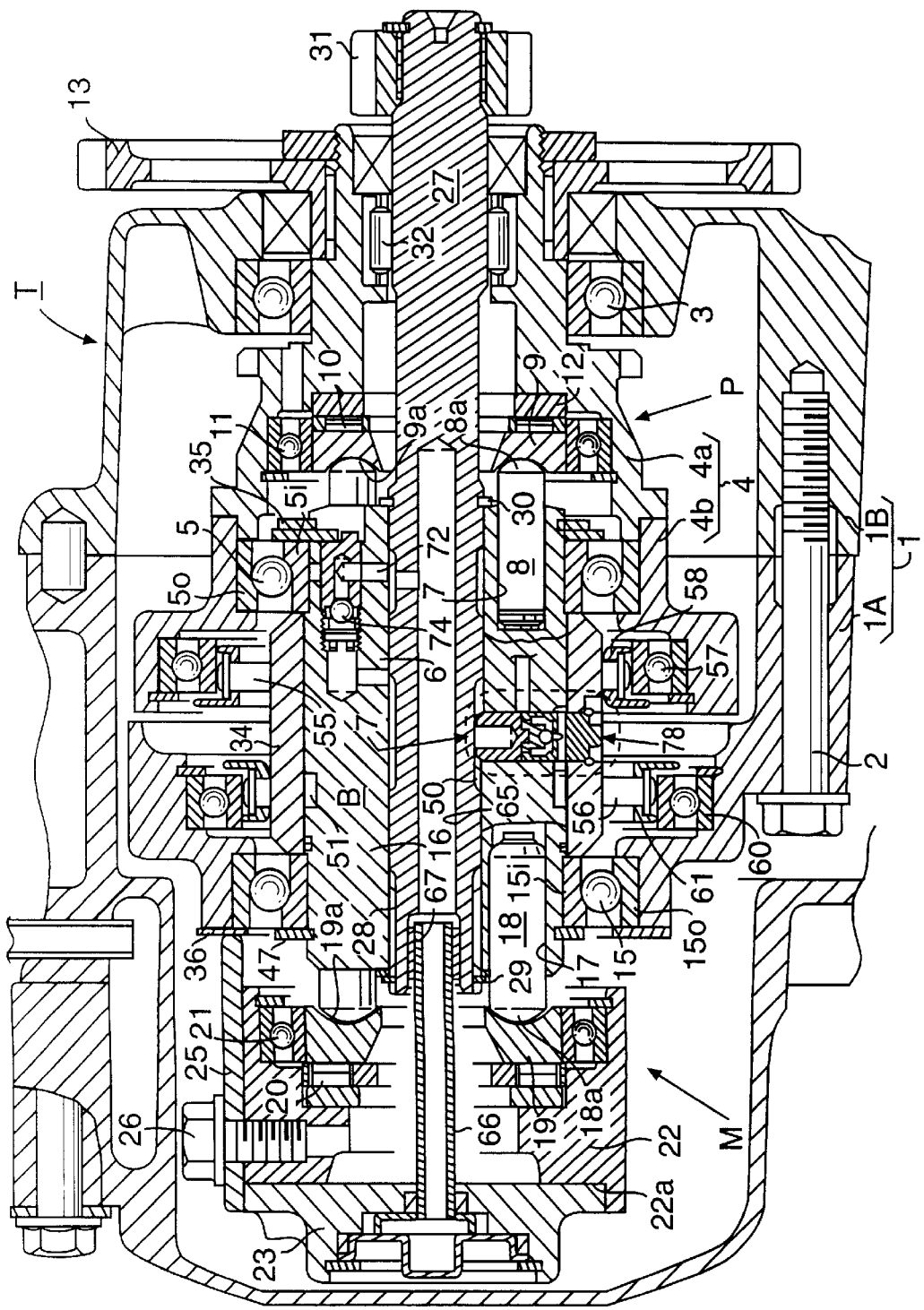
FIG. 3 is a sectional view taken on line 3—3 of FIG. 2.

Referring to FIGS. 1 to 3, a power unit of a motorcycle includes a transmission case 1 composed of right and left case halves 1B, 1A connected to each other by means of a bolt 2. The transmission case 1 contains a continuously variable transmission T including a constant displacement type swash plate hydraulic pump P and a variable displacement type swash plate hydraulic motor M. The hydraulic pump P and the hydraulic motor M constitute an oil pressure closing circuit.

The hydraulic pump P includes an input cylindrical shaft 4 rotatably and axially movably supported on the outer end portion of the right case half 1B through a radial bearing 3. A pump cylinder 6 is relatively rotatably supported on the input cylindrical shaft 4 through a first angular contact bearing 5. A plurality of pump plungers 8 are each slidably inserted in a plurality of the odd number of cylindrical holes 7 annularly arranged in the pump cylinder 6 so as to surround the rotational axis of the pump cylinder 6. A pump swash plate 9 is provided with a front surface brought into contact with the outer ends of the pump plungers 8 and a pump swash plate holder 12 for supporting the swash plate 9 through a thrust bearing 10 and a radial bearing 11 for holding the pump swash plate 9 in a posture in which the pump swash plate 9 is tilted around a virtual trunnion axial line $0_1$ perpendicular to the axial line of the pump cylinder 6 at a specified angle with respect to the axial line of the pump cylinder 6. The pump swash holder 12 is formed integrally with the input cylindrical shaft 4.

The right end portion of the input cylindrical shaft 4 projects outwardly from the right case half 1B, and is fixed with an input gear 13 to which power from an engine (not shown) is to be inputted.

When the input cylindrical shaft 4 is rotated, each pump plunger 8 is reciprocated with the aid of the pump swash plate 9 to repeat suction and discharge strokes.

On the other hand, the hydraulic motor M is disposed coaxially with and leftward from the pump cylinder 6. The hydraulic motor M includes a motor cylinder 16 rotatably supported on the left case half 1A through a second angular contact bearing 15. A plurality of motor plungers 18 are each slidably inserted in a plurality of, the odd number of, cylinder holes 17 annularly arranged in the motor cylinder 16 so as to surround the rotational axis of the motor cylinder 16. A motor swash plate 19 is provided with its front surface brought in contact with the outer ends of the motor plungers 18. A motor swash holder 22 supports the motor swash plate 19 through a thrust bearing 20 and a radial bearing 21. A motor swash plate anchor 23 supports the back surface of the motor swash plate holder 22. The motor swash plate anchor 23 is fixed on the outer end portion of the left case half 1A by means of a plurality of bolts 24.

Each of opposite contact surfaces $f_1$, $f_2$ of the motor swash plate holder 22 and the motor swash plate anchor 23 is formed into a semi-cylindrical surface centered at a trunnion axial line $0_2$ perpendicular to the axial line of the motor cylinder 16 for allowing the tilting of the motor swash plate holder 22 around the trunnion axial line $0_2$.

To restrict relative sliding in the direction of the trunnion axial line $0_2$ between the motor swash plate holder 22 and the motor swash plate anchor 23, as shown in FIG. 3, a flange 22a which is brought into contact with one end surface of the motor swash plate anchor 23 is formed at one end of the motor swash plate holder 22. In addition, a speed change lever 25 is brought into contact with the other surface of the motor swash plate anchor 23 and is fixed on the other end surface of the motor swash plate holder 22 by means of a bolt 26. Accordingly, the turning of the speed change lever 25 allows the motor swash plate holder 22 to be tilted around the trunnion axial line $0_2$ so that the tilting angle of the motor swash plate 19 is adjusted between an upright position where it is upright to the axial line of the motor cylinder 16 and the maximum tilting position where it is tiled at a specified angle.

When the motor cylinder 16 is rotated into a state in which the motor swash plate 19 is tilted, each motor plunger 18 is reciprocated by the motor swash plate 19 to repeat expansion and contraction strokes.

The pump cylinder 6 and the motor cylinder 16 are integrated with each other, to form a cylinder block B. An output shaft 27 is connected to the central portion of the cylinder block B in the rotational direction through a spline 28 in such a manner so as to pass through the cylinder block B. The output shaft 27 is also axially connected to the cylinder block B through a pair of right and left snap rings 30, 29.

The output shaft 27 has the left end portion terminated in front of the motor swash plate 19 and the right end portion passing through the input cylindrical shaft 4 and projecting outwardly therefrom. The projecting end of the output shaft 27 is additionally provided with an output gear 31 for outputting power to a rear wheel of a motorcycle. At this time, the output shaft 27 is rotatably and axially movably supported on the input cylindrical shaft 4 through a radial bearing 32.

The input cylindrical shaft 4 is divided into a funnel-shaped portion 4a integrated with the pump swash plate holder 12 and supported by the right case half 1B through the radial bearing 3, and a cylindrical portion 4b supporting the pump cylinder 6 through the first angular contact bearing 5. Both the portions 4a, 4b are connected to each other by means of a bolt 33. At this time, an outer race 5o of the first angular contact bearing 5, which is held between both the portions 4a, 4b, and an inner race 5i of the bearing 5, is fixed on the outer peripheral surface of the pump cylinder 6 by means of a sleeve 34 (described later) and a snap ring 35. The input cylindrical shaft 4 and the pump cylinder 6 are thus axially fixedly connected to the first angular contact bearing 5.

The second angular contact bearing 15 is disposed radially inwardly from and in the vicinity of a plurality of bolts 24 for connecting the motor swash plate anchor 23 to the outer end portion of the left case half 1A. An outer race 15o of the bearing 15 is fixed on the left case half 1A by means of a pressing plate 36 held between the left case half 1A and the motor swash plate anchor 23, and an inner race 15i of the bearing 15 is fixed on the outer peripheral surface of the motor cylinder 16 by means of the sleeve 34 (described later) and a snap ring 47. The motor cylinder 16 and the motor swash plate anchor 23 are thus axially fixedly connected to the second angular contact bearing 15.

To rotate the pump swash plate 9 in synchronization with the pump cylinder 6, spherical recesses 9a each engaged with spherical end portions 8a of the pump plungers 8 are formed in the front surface of the pump swash plate 9.

To rotate the motor swash plate 19 in synchronization with the motor cylinder 16, spherical recesses 19a each engaged with spherical end portions 18a of the motor plungers 18 are formed in the front surface of the motor swash plate 19.

The spherical recesses 9a, 19a are larger in radius than the corresponding spherical end portions 8a, 18a so as to be kept in engagement with the corresponding spherical end portions 8a, 18a even in any operating position.

Figure 6:
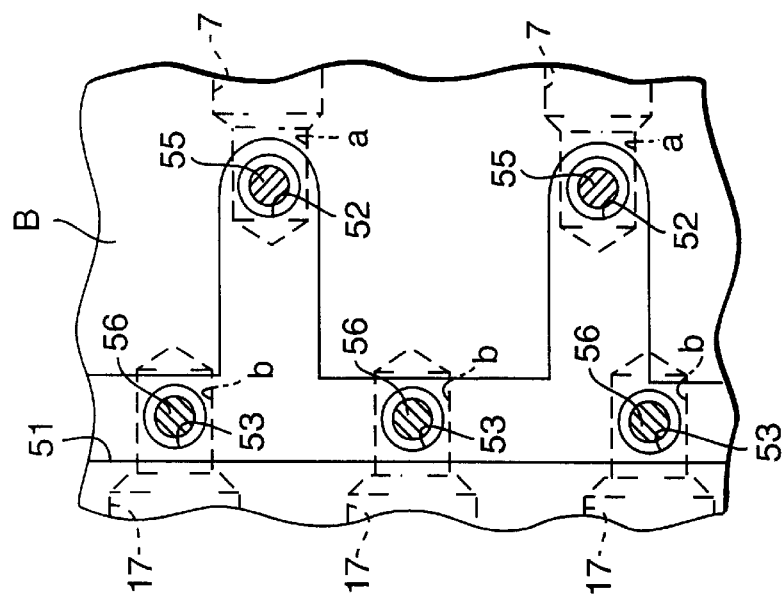
FIG. 6 is a development of an outer oil passage in FIGS. 2 and 3.

As shown in FIGS. 2, 3 and 6, an annular inner oil passage 50 (low pressure oil passage) and an annular outer oil passage 51 (high pressure oil passage) are formed between the pump cylinder 6 and the motor cylinder 16. More specifically, the oil passage 50 is positioned between the inner periphery of the cylinder block B and the outer periphery of the output shaft 27, and the oil passage 51 is positioned between the outer periphery of the cylinder block B and the sleeve 34 fitted and brazed on the outer peripheral surface of the block B. The annular bulkhead and the sleeve 34 between both the oil passages 50, 51 have a group of first valve holes 52 and a group of second valve holes 53 which are formed in such a manner so as to radially pass through the bulkhead and the sleeve 34 and to be adjacent to a group of the cylinder holes 7 and a group of the cylinder holes 17, respectively. The adjacent first valve hole 52 and the cylinder hole 7 are communicated to each other through a pump port "a" and the adjacent second valve hole 53 and the cylinder hole 17 are communicated to each other through a motor port "b." A spool type first distribution valve 55 is inserted in each first valve hole 52 and a spool type second distribution valve 56 is inserted in each second valve hole 53.

Figure 4:
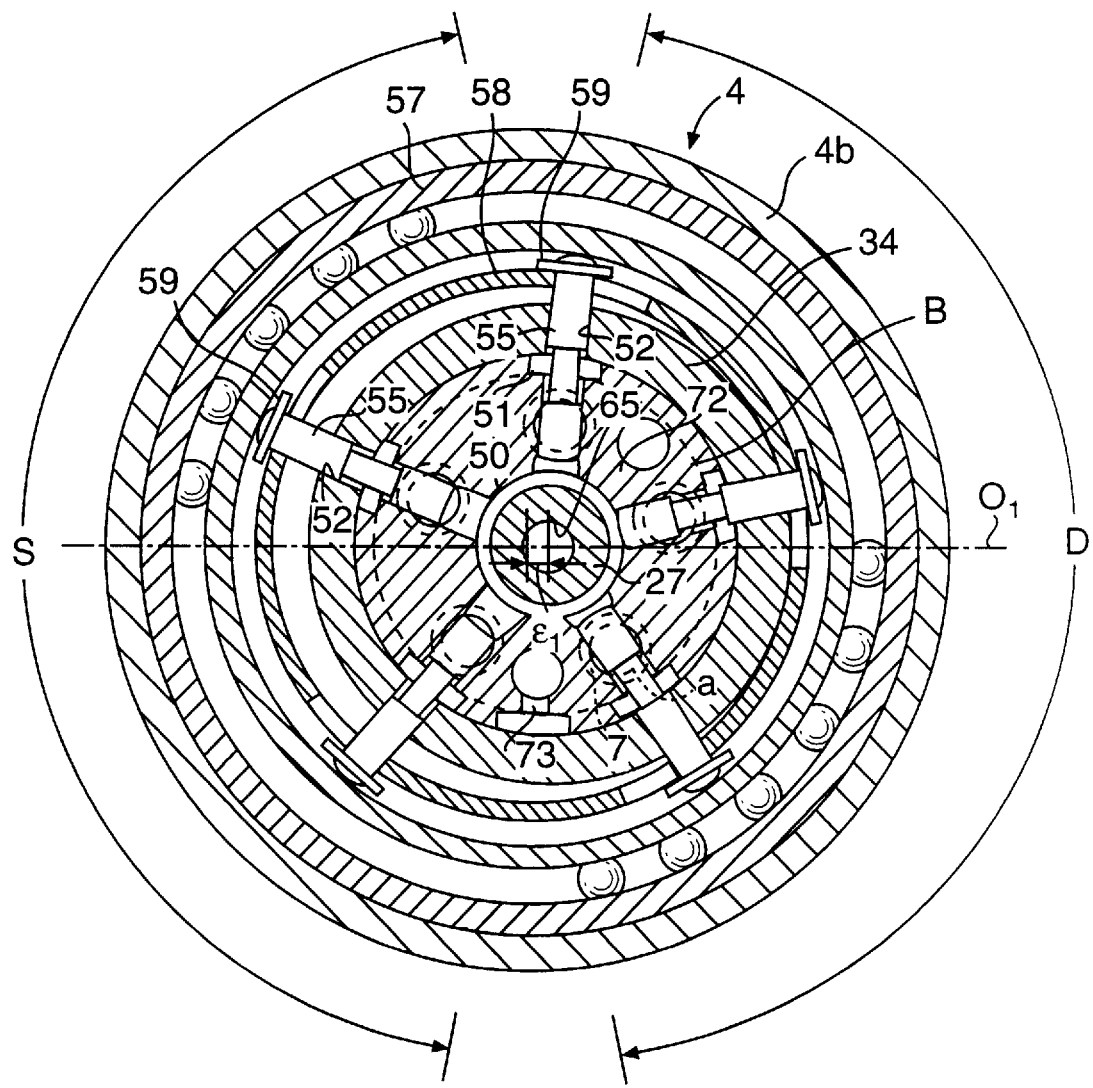
FIG. 4 is a sectional view taken on line 4—4 of FIG. 2.

As shown in FIG. 4, a first eccentric ring 57 is disposed around the outer peripheries of a group of the first distribution valves 55 in such a manner so as to be engaged with the outer ends thereof. A first forcing ring 58, coaxial with the first eccentric ring 57, is connected to the first distribution valves 55 by means of clips 59 for usually ensuring engagement between the first distribution valves 55 and the first eccentric ring 57.

The first eccentric ring 57 is formed of a ball bearing, and is mounted in the input cylindrical shaft 4 in such a manner so as to be held at a position being eccentric along the virtual trunnion axial line $0_1$ from the center of the output shaft 27 by a specified distance $\epsilon_1$.

When a relative rotation is generated between the input cylindrical shaft 4 and the pump cylinder 16, each first distribution valve 55 is reciprocated in each first valve hole 52 by means of the first eccentric ring 57 by a stroke equivalent to a distance twice the eccentric amount $\epsilon_1$. In a discharge region D of the hydraulic pump P, the first distribution valve 55 is moved to the inner end side of the first valve hole 52 to allow all of the corresponding pump ports to be communicated to the outer oil passage 51 and not to be communicated to the inner oil passage 50, with a result that the pump plunger 8 in a discharge stroke acts to press-feed a working oil from the cylinder hole 7 into the outer oil passage 51. Also, in a suction region S of the hydraulic pump P, the first distribution valve 55 is moved to the outer end side of the first valve hole 53 to allow the corresponding pump port "a" to be communicated to the inner oil passage 50 and not to be communicated to the outer oil passage 51, with a result that the pump plunger 8 in the suction stroke acts to suck a working oil from the inner oil passage 50 into the cylinder hole 7.

Figure 5:
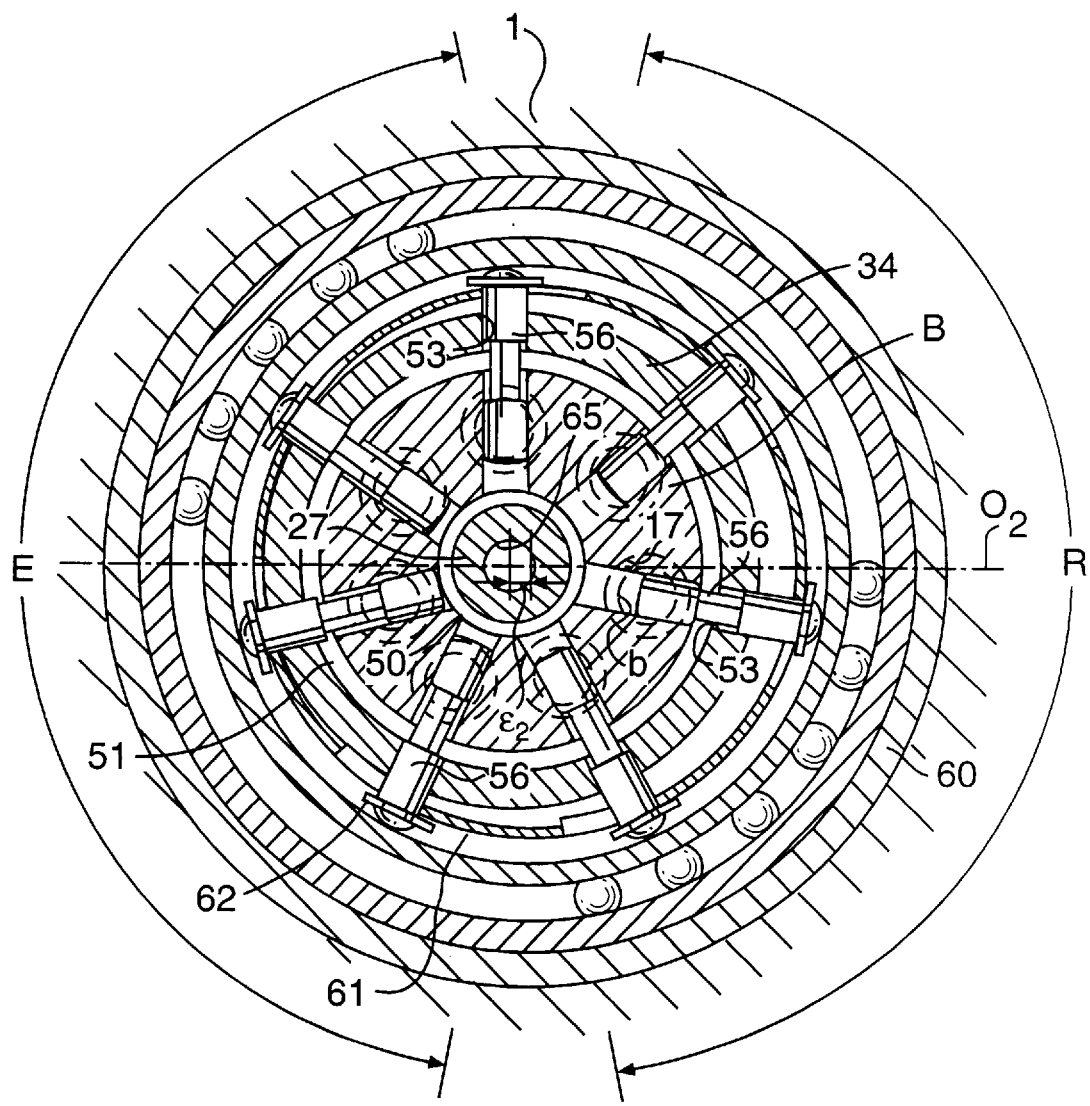
FIG. 5 is a sectional view taken on line 5—5 of FIG. 2.

As shown in FIG. 5, a second eccentric ring 60 is disposed around the outer peripheries of a group of the second distribution valves 56 in such a manner so as to be engaged with the outer ends thereof. A second forcing ring 61, coaxial with the second eccentric ring 60, is connected to the second distribution valves 56 by means of clips 62 for usually ensuring engagement between the second distribution valves 56 and the second eccentric ring 60.

The second eccentric ring 60 is formed of a ball bearing, and is mounted in the left case half 1A so as to be held at a position being eccentric along the trunnion axial line $O_2$ from the center of the output shaft 27 by a specified distance $\epsilon_2$.

Accordingly, when the motor cylinder 16 is rotated, each second distribution valve 56 is reciprocated in each second valve hole 53 by means of the second eccentric ring 60 by a stroke equivalent to a distance twice the eccentric amount $\epsilon_2$. In an expansion region E of the hydraulic motor M, the second distribution valve 56 is moved to the inner end side of the second valve hole 53 to allow the corresponding motor port "b" to be communicated to the outer oil passage 51 and not to be communicated to the inner oil passage 50, thereby supplying a high pressure working oil from the outer oil passage 51 into the cylinder hole 17 in which the motor plunger 18 is in the expansion stroke. Also, in a contraction region R of the hydraulic motor M, the second distribution valve 56 is moved to the outer end side of the second valve hole 53 to allow the corresponding motor port "b" to be communicated to the inner oil passage 50 and not to be communicated to the outer oil passage 51, thereby returning a working oil into the inner oil passage 50 from the cylinder hole 17 in which the motor plunger 18 is in the contraction stroke.

The cylinder block B is thus rotated by the total of a reaction torque received by the pump swash plate 9 through the pump plungers 8 in the discharge stroke and a reaction torque received by the motor swash plate 19 through the motor plungers 18 in the expansion stroke, and the rotational torque thereof is transmitted to the output shaft 27.

In this case, a speed change ratio of the output shaft 27 to the input cylindrical shaft 4 is given by the following equation:

$$\text{speed change ratio} = 1 + (\text{capacity of hydraulic motor M})/(\text{capacity of hydraulic pump P}) \quad (1)$$

Accordingly, the speed change ratio can be changed from 1 to a necessary value by changing the capacity of the hydraulic motor M from zero to a specified value. Also, the speed change ratio can be continuously controlled by tilting the motor swash plate 19 from the upright state to a specified tilting position because the capacity of the hydraulic motor P is determined on the basis of the stroke of the motor plungers 18.

Incidentally, a thrust load acting to axially separate the input cylindrical shaft 4 from the pump cylinder 6 is generated therebetween by a pressing action of the pump plungers 8 to the pump swash plate 9 during operation of the hydraulic pump P. However, since the input cylindrical shaft 4 and the pump cylinder 6 are axially connected to each other through the first angular contact bearing 5, such a thrust load is absorbed by the bearing 5, to thereby prevent the load from being applied to the transmission case 1 and the output shaft 27.

A thrust load acting to axially separate the motor cylinder 16 from the motor swash plate 23 is generated therebetween by a pressing action of the motor swash plate 19 to the motor plungers 18 during operation of the hydraulic motor M. However, since the motor cylinder 16 and the motor swash plate 23 are axially connected to each other through the second angular contact bearing 15 and the outer end portion of the left case half 1A, the load is absorbed by the bearing 15 and the outer end portion of the left case half 1A to thereby prevent the load from being applied to the output shaft 27.

In this case, since the second angular contact bearing 15 is disposed radially inwardly of and in the vicinity of a plurality of the bolts 24 connecting the motor swash plate anchor 23 to the outer end portion of the left case half 1A, it becomes possible to make narrower a thrust load acting region of the left case half 1A to the utmost while suppressing an increase in the axial dimension of the transmission T. As a result, the transmission case 1 can be ensured in durability only by increasing the thickness of a portion applied with a thrust load of the left case half 1A.

Moreover, since the pump cylinder 6 and the motor cylinder 16 are integrated with each other to form the cylinder block B and the input cylindrical shaft 4 is axially movably supported on an outer end portion of the right case half 1B through the radial bearing 3, it becomes possible to positively prevent a thrust load generated between the input cylindrical shaft 4 and the motor swash plate anchor 23 from being applied between both the case halves 1A, 1B and to reduce the thickness and the weight of the transmission case 1.

Additionally, since the output shaft 27 has the right end as the output end projecting outwardly from the input cylindrical shaft 4 and the left end terminated in front of the motor swash plate 19, the transmission T is reduced in its axial dimension and also the tilting range, that is, the speed change range of the motor swash plate 19 can be extended without interference with the output shaft 27. In addition, an oil introducing pipe 66 (described later) passes through the central portions of the motor swash plate 19 and the motor swash plate holder 22. However, the oil introducing pipe 66 does not obstruct the tilting of the motor swash plate 19 and the like because the size thereof is very small relative to the size of the output shaft 27.

Figure 8:
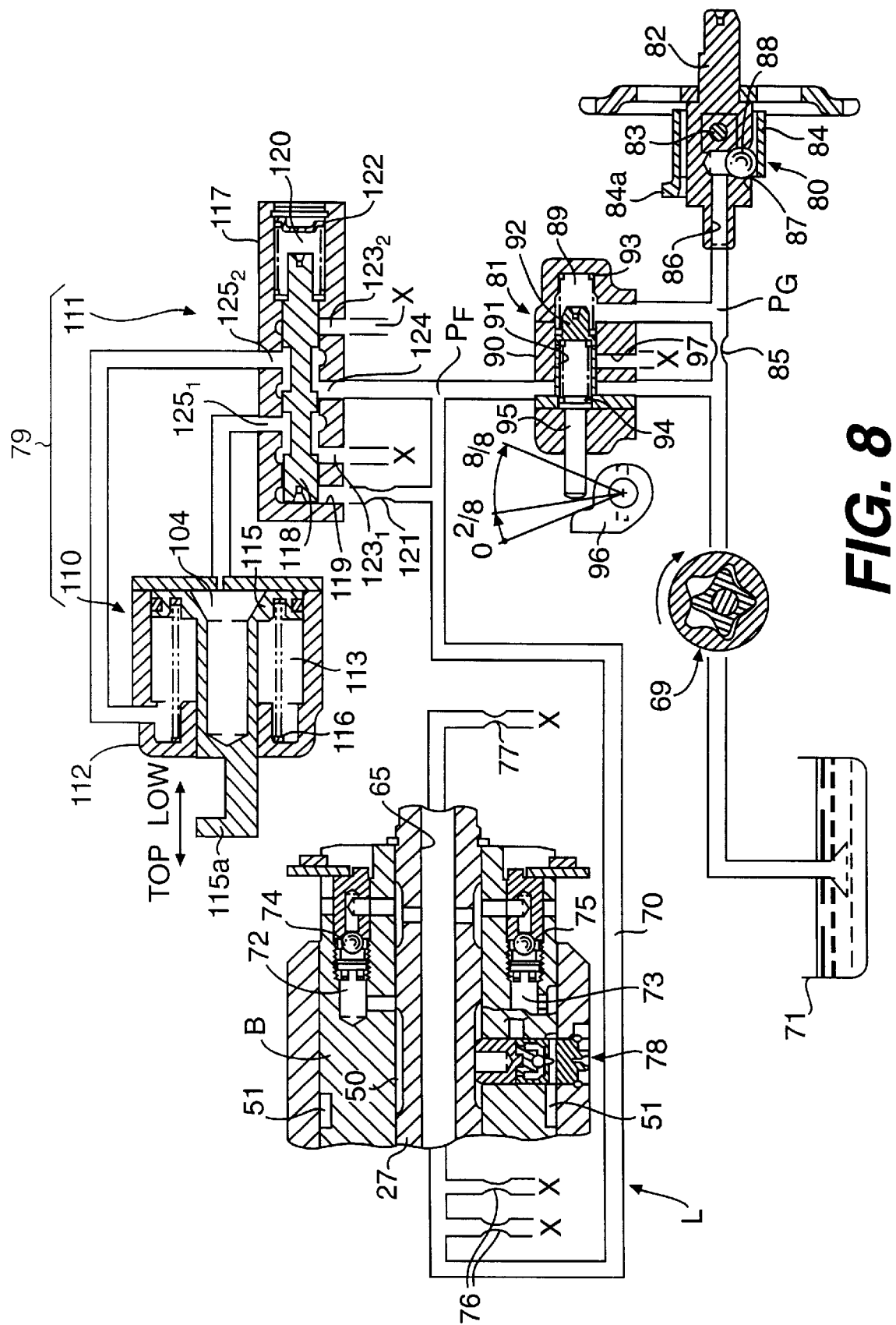
FIG. 8 is a diagram of a hydraulic circuit for control of a speed change valve and a clutch valve.

Referring to FIGS. 1, 2 and 8, the output shaft 27 has at its central portion an oil supply hole 65 extending from the hydraulic motor M side. The oil introducing pipe 66 extending from the motor swash plate anchor 23 and passing through the central portions of the motor swash plate holder 22 and the motor swash plate 19 is relatively rotatably inserted in the inlet of the oil supply hole 65 through a bushing 67. The oil introducing pipe 66 is communicated to a discharge port of an oil supply pump 69 driven by the input cylindrical shaft 4 through a gear row 68, by way of a series of oil passages 70 formed in the transmission case 1 and the motor swash plate anchor 23. The oil supply pump 69 operates to pump a working oil from an oil passage 71 on the bottom of the transmission case 1 and to supply it to the oil supply hole 65 through an oil passage 70 and the oil introducing pipe 66. These oil supply hole 65, oil introducing pipe 66 and the oil passage 70 constitute an oil supply passage L.

The oil supply hole 65 is connected to the inner and outer oil passages 50, 51 through first and second branched passages 72, 73 formed in the output shaft 27 and the cylinder block B, respectively. First and second check valves 74, 75 are provided in the first and second branched passages 72, 73, respectively. Accordingly, upon normal operation, when the inner oil passage 50 is reduced in pressure due to oil leakage from the hydraulic pump P and the hydraulic motor M, the first check valve 74 is opened to supply a working oil from the supply oil passage L into the inner oil passage 50. Upon braking, when the outer oil passage 51 is reduced in pressure, the second check valve 75 is opened to supply a working oil from the supply oil passage L into the outer oil passage 51.

The peripheral wall of the oil introducing pipe 66 has a plurality of blow holes 76 which allow a working oil to be blown for lubricating surroundings of the motor swash plate 19. The output shaft 27 has a blow hole 77 in communication with the oil supply hole 65 which allows a working oil to be blown for lubricating the surroundings of the pump swash plate 9.

Figure 7:
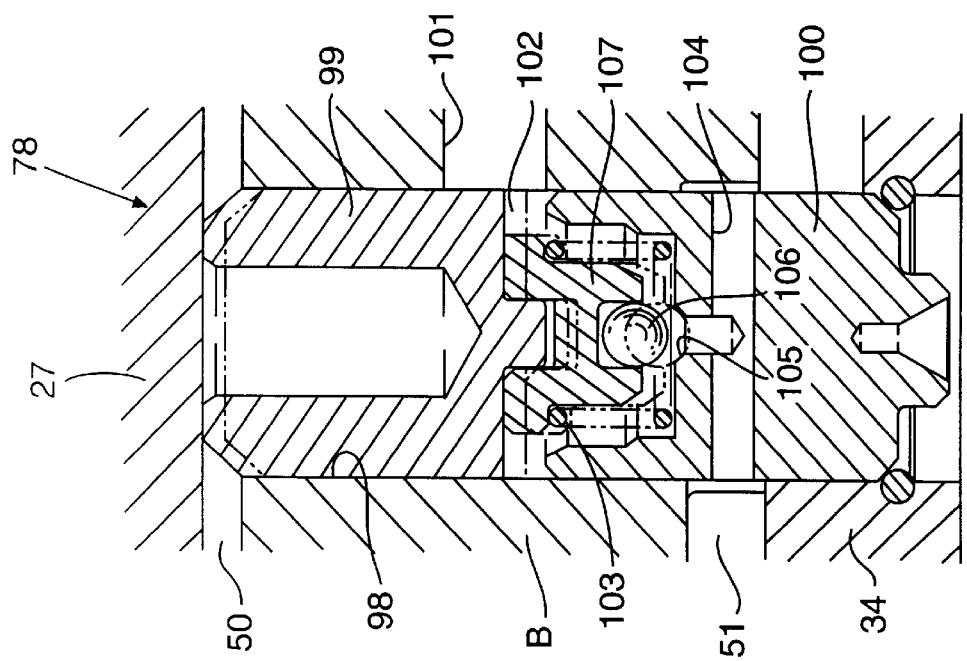
FIG. 7 is an enlarged view of a portion (clutch valve) 7 in FIG. 3.

Referring to FIGS. 1, 7 and 8, the continuously variable transmission T includes a clutch valve 78 for cutting-off/re-starting the oil pressure transmission of the hydraulic pump P and the hydraulic motor M. A hydraulic servomotor 99 for operating the speed change lever 25 and an oil pressure governor 80 and a throttle valve 81 for automatically controlling the clutch valve 78 and the hydraulic servomotor 99.

The hydraulic governor 80 has a rocking cylinder 84 supported through a pivot 83 by a rotational shaft 82 of the oil supply pump 69 driven by the input cylindrical shaft 4 through a gear row 68 in such a manner as to surround the rotational shaft 82. The rocking cylinder 84 has a weight portion 84a at one rocking end so as to be rocked on the weight portion 84a side when the centrifugal force of the weight portion 84a is increased linearly with the rotational speed of the rotational shaft 82. The rotational shaft 82 has a governor oil passage 86 communicated to the oil passage 70 connected to the discharge port of the oil supply port 69 through an orifice 85 and a conical valve seat 87 to open the oil passage 86 on the outer side surface of the rotational shaft 82 opposite to the weight portion 84a. A ball-like valve body 88 for opening/closing the oil passage 86 in co-operation with the valve seat 87 is contained in the rocking cylinder 84. The oil passage 86 is connected to a governor oil pressure chamber 89 of the throttle valve 81.

Figure 10:
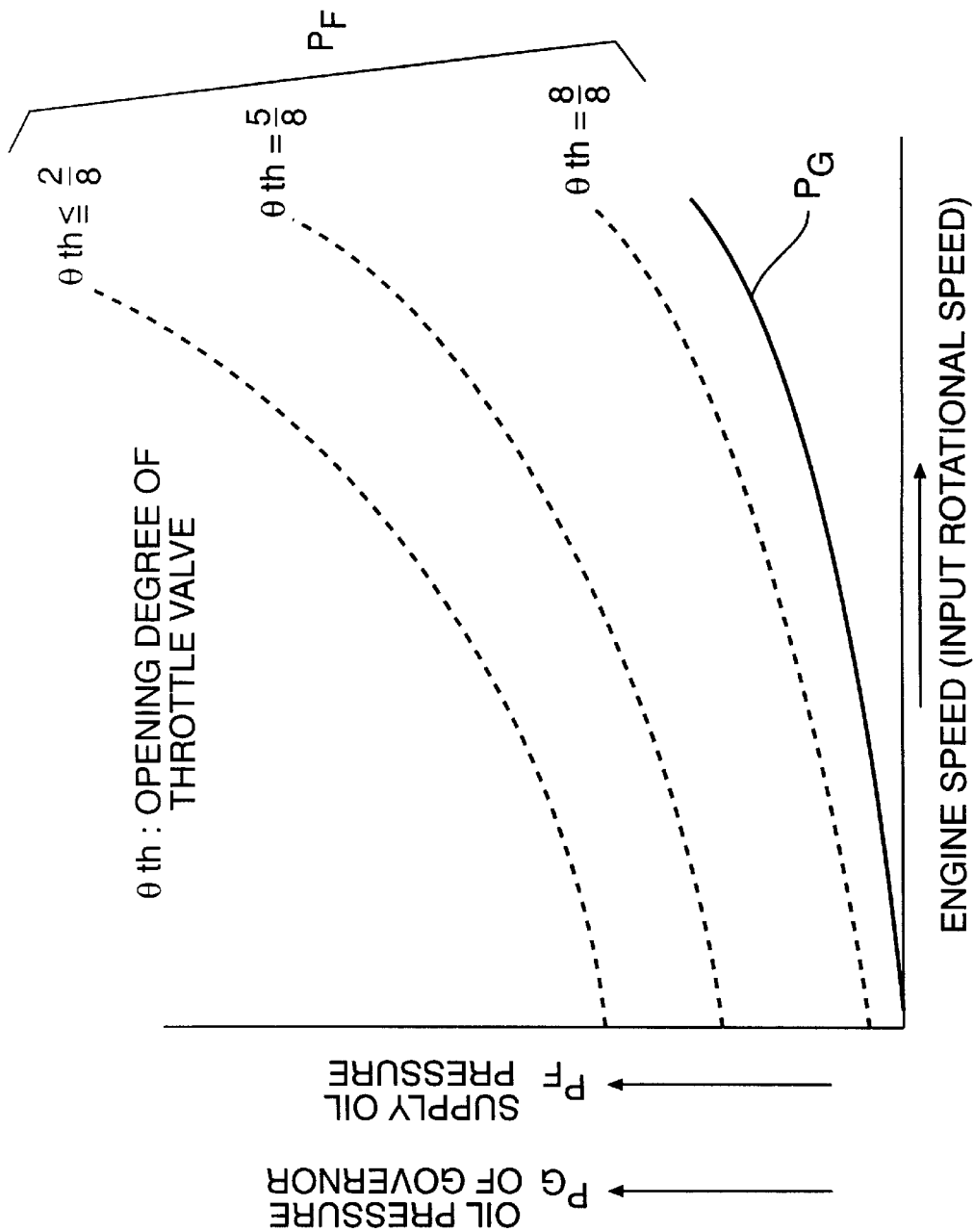
FIG. 10 is a graph showing characteristics in control of a supply oil pressure by an oil pressure governor and a throttle valve.

Accordingly, when a rotational speed of the rotational shaft 82, that is, the rotational speed of the engine driving the input cylindrical shaft 4 is relatively low and thereby the centrifugal force of the weight portion 84a is relatively small, the seating force of the valve body 88 to the valve seat 87 due to the centrifugal force is relatively weak so that oil pressure is released from the valve seat 87. However, when the engine speed becomes higher, the seating force of the valve body 88 to the valve seat 87 due to the centrifugal force of the weight portion 84a is increased to suppress the release of the oil pressure. As a result, an oil pressure PG in the governor oil passage 86 and the governor oil pressure 89 downstream from the orifice 85 is increased linearly with the engine speed, as shown in FIG. 10.

The throttle valve 81 has a valve hole 91 of a valve body 90 mounted on the transmission case 1. A discharge port 97 is opened in an intermediate portion of the valve hole 91 for opening the oil passage 70 to an oil reservoir 71. A cylindrical valve body 92 is slidably inserted in the valve hole 91 for opening/closing the discharge port 97, a return spring 93 is provided for biasing the valve body 92 in the direction of closing the discharge port 97. An operating lever 95 supports the base portion of the operating spring 94. A throttle lever 96 is capable of pushing the operating lever 95. The throttle lever 96 is interlocked with the opening/closing of a throttle valve (not shown) of the engine. More specifically, when the throttle valve of the engine is opened by a specified opening degree or more (⅖, in the figure), the throttle lever 96 pushes a throttle bar 95 on the basis of increasing the opening degree to thereby increase a load applied to the operating spring 94.

The set load of the return spring 93 is set to be smaller than that of the operating spring 94 so that the return spring 93 holds the valve body 92 at the position where the discharge port 97 is closed when the operating lever 95 is retracted. The end surface, on the oil passage 70 side, of the valve body 92 usually faces to the oil passage 70 to receive an oil pressure of the oil passage 70. The above governor oil pressure chamber 89 to which the end surface of the valve body 92 faces on the side opposite to the operating spring 94, is defined in the valve hole 91.

Accordingly, the valve body 92 is operated by a balancing action between a load of the operating spring 93 applied to press the valve body 92 in the direction of closing the discharge port 97 and an oil pressure of the governor oil pressure chamber 89. A load of the operating spring 93 is applied to press the valve body 92 in the direction of opening the discharge port 97 and an oil pressure of the oil passage 70. Accordingly, when the oil supply pump 69 is first driven by the input cylindrical shaft 4 upon the starting of the engine to generate an oil pressure in the oil passage 70, the valve body 93 is pushed in the direction of opening the discharge port 97 by the oil pressure of the oil passage 70 and is simultaneously pushed in the direction of closing the discharge port 97 by an oil pressure $P_G$ of the governor oil pressure chamber 89, to thus start the adjustment of the oil pressure $P_F$ of the oil supply passage L.

Incidentally, since the operating lever 95 does not push the operating spring 94 until the throttle valve of the engine is opened by the opening degree of ⅖, the load of the operating spring 94 is held at a minimum and thereby the opening of the discharge port 97 by the valve body 92 is the smallest, so that the oil pressure $P_F$ of the supply oil passage L is controlled to be relatively higher as shown by a dotted line positioned uppermost in FIG. 10. On the other hand, when the throttle valve of the engine is opened in the opening degree (⅔) or more, a throttle lever 96 pushes the operating lever 95 to increase a load applied to the operating spring 94, thereby increasing the opening of the discharge port 97 by the valve body 92. As a result, the oil pressure $P_F$ of the supply oil passage L is controlled to be reduced, that is, it is shifted from the upper one to the lower one in a plurality of the dotted lines in FIG. 10.

On the other hand, in each opening degree of the throttle valve of the engine, when the engine speed is increased, the oil pressure $P_G$ of the governor oil pressure chamber 89 is increased by the action of the oil pressure governor 80, thereby increasing the closing of the discharge port 97 by the valve body 92. As a result, an oil pressure of the supply oil passage L is controlled to be increased.

The oil pressure $P_F$ of the supply oil passage L thus controlled is supplied into the inner oil passage 50 through the first check valve 74, so that the oil pressure of the inner oil passage 50 becomes substantially the same as that of the supply oil passage L.

Referring to FIG. 7, the clutch valve 78 has a valve piston 99 and a plug body 100. The valve piston 99 is slidably inserted in a cylindrical mounting hole 98 formed in the cylinder block B in a range from the inner and outer oil passages 50, 51 and faces at one end to the inner oil passage 50, and the plug body 100 is fixed in the mounting hole 98 opposite to the other end of the valve piston 99. An oil chamber 102 opened in the oil reservoir 71 through the discharge port 101 is defined between the valve piston 99 and the plug body 100. A return spring 103 for biasing the valve piston 99 on the inner oil passage 50 side is contained in the oil chamber 102.

The plug body 100 includes a through-hole 104 communicated to the outer oil passage 51, and a conical valve seat 105 for opening the through-hole 104 to the oil chamber 102. A valve body 106 which is smaller in diameter relative to the valve piston 99 is additionally provided on the valve piston 99 through a retainer 107.

Accordingly, upon idling of the engine, the inner oil passage 50 is controlled to be relative low in pressure by a pressure reducing action of the oil pressure governor 80, so that the valve piston 99 is pushed onto the inner oil passage 50 side by the return spring 103 to release the valve body 106 from the valve seat 105, thereby releasing the oil pressure of the outer oil passage 51 to the discharge port 101 through the through-hole 104 and the oil chamber 102. The hydraulic pump P and the hydraulic motor M are thus positioned in an oil pressure transmission cutting-off state, that is, in a clutch-off state.

When the engine speed is increased, the oil pressure of the inner oil passage 50 is increased by a pressure increasing action of the oil pressure governor 80, and the valve piston 99 allows the valve body 106 to be gradually moved toward the valve seat 105 against a force of the return spring 103 and to be finally seated on the valve seat 105, thereby restricting and stopping the release of the oil pressure from the outer oil passage 51. As a result, the hydraulic pump P and the hydraulic motor M are shifted to an oil pressure transmission state, that is, clutch-on state through a semi-clutch state, thus allowing the vehicle to be smoothly started.

In such a clutch-on state, a high oil pressure of the outer oil passage 51 is usually applied to part of the spherical valve body 106 which is very small in diameter relative to the valve piston 99, and accordingly if an excessive load is applied to the hydraulic motor M and an excessive oil pressure is generated in the outer oil passage 51, a pressing force of the excessive oil pressure of the outer oil passage 51 against the valve body 106 exceeds a pressing force of the oil pressure of the inner oil passage 50 against the valve piston 99, to thereby open the valve body 106. As a result, the excessive oil pressure of the outer oil passage 51 is discharged in the discharge port 101, to avoid the excessive load. In this way, the clutch valve 78 has a function of an oil pressure limiter for protecting the hydraulic motor M from excessive oil pressure.

The hydraulic servomotor 79 has a hydraulic cylinder 110 and a control valve 111, as shown in FIGS. 1 and 8. The hydraulic cylinder 110 includes a cylinder body 102 formed integrally with the transmission case 1, an operating piston 115 for defining the interior of the cylinder body 102 into right and left oil chambers 113, 114, and a return spring 116 for biasing the operating piston 115 to the right oil chamber 114 side. The operating piston 115 has a rod 115a passing through the left oil chamber 113 and projecting outwardly from the cylinder body 112, and is connected at the leading end with the speed change lever 25.

The speed change lever 25 is held at a position, low position, where the motor swash plate 19 is tiled at a maximum at the rightward movement limit of the operating piston 115 where the left oil chamber is extended at a maximum. When the operating piston 115 is moved leftward from the low position, the speed change lever 25 can be operated in the direction, top direction, where the motor swash plate 19 is raised.

The control valve 111 includes a valve cylinder 117 formed integrally with the valve body 90, and a spool type valve body 118 contained in the valve cylinder 117. The valve cylinder 117 contains an operating oil chamber 119 to which the left end surface of the valve body 118 faces, and an atmospheric air chamber 120 to which the right end surface of the valve body 118 faces. The operating oil chamber 119 receives oil pressure from the oil passage 70 through an orifice 121, and the atmospheric air chamber 120 contains a return spring 122 for biasing the valve body 108 to the operating oil chamber side 119.

A first discharge port $123_1$, an input port 124 and a second discharge port $123_2$ are provided in one side of the valve cylinder 117 from the left side as illustrated in FIG. 8, in this order, and a first output port $125_1$, and a second output port $125_2$ are provided in the other side of the valve cylinder 117.

The input port 124 is opened to the oil passage 70, and the first and second discharge ports $123_1$, $123_2$ are opened to the oil reservoir 71.

On the other hand, the first output port $125_1$, is connected to the right oil chamber 114 of the hydraulic cylinder 120, and the second output port $125_2$ is connected to the left oil chamber 113 of the hydraulic cylinder 120.

Accordingly, when the oil pressure of the operating oil chamber 119, that is, the oil pressure of the oil passage 70 is relatively low, the valve body 118 is held at the leftward movement limit so that the input port 124 is communicated to the second output port $125_2$ and the first output port $125_1$, is communicated to the first discharge port $123_1$. Thus, an oil pressure of the oil passage 70 is supplied to the left oil chamber 113 of the hydraulic cylinder 110 to move the operating piston 115 rightwardly, thereby holding the speed change holder 25 at the low position. When the valve body 118 is moved rightwardly with an increase in pressure of the operating oil chamber 119, the input port 124 is communicated to the first output port $125_1$, and the second output port $125_2$ is communicated to the second discharge port $123_2$. Thus, an oil pressure of the oil passage 70 is supplied to the right oil chamber 114 of the hydraulic cylinder 110 to move the operating piston 115 leftwardly, thus operating the speed change lever 25 on the top side.

Incidentally, the oil pressure introduced from the oil passage 70 to the operating oil chamber 119 of the control valve 118 is controlled by the oil pressure governor 79 and the throttle valve 81 as described above, and consequently the control valve 101 is automatically controlled on the basis of input signals such as an engine speed and an opening degree of the throttle valve. More specifically, when the engine speed is increased, the operating piston 115 tends to be operated onto the top side, and when the opening degree of the throttle valve is increased, the operating piston 115 tends to be operated onto the low side.

Figure 9:
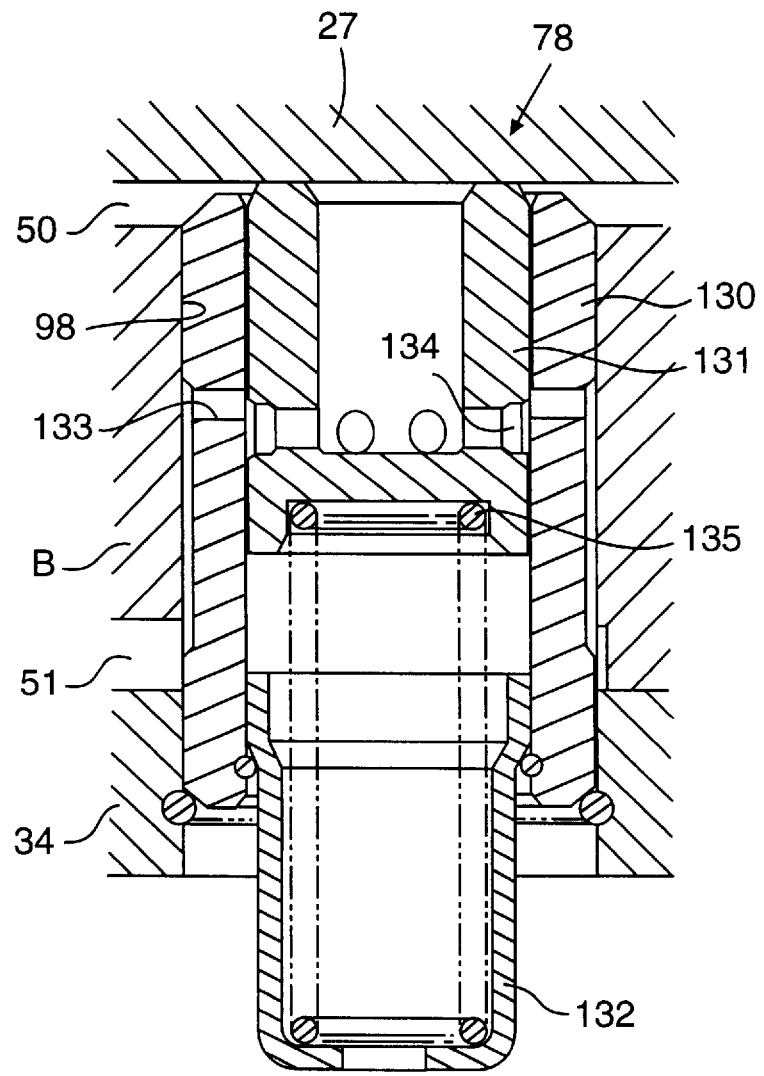
FIG. 9 is an enlarged view, corresponding to FIG. 7, showing a modification of the clutch valve.

FIG. 9 shows a modification of the clutch valve 78, which includes a valve cylinder 130 inserted in a mounting hole 98 of the cylinder block B, a spool valve body 121 is slidably inserted in the valve cylinder 130, and a cup-like plug body 132 is fixedly fitted in the valve cylinder 130. The valve cylinder 130 has a plurality of horizontal holes connected to the outer oil passage 51, and the spool valve body 131 has on the outer periphery an annular groove 134 connected to the inner oil passage 50. The spool valve body 131 is biased on the inner oil passage 50 side by means of a return spring 135 contained between the valve body 131 and the plug body 132.

Accordingly, when the oil pressure of the inner oil passage 50 is relatively low, the spool valve body 131 is pushed to the inner oil passage 50 side by means of the return spring 125 to allow the annular groove 134 and the horizontal holes 123 to be communicated to each other for short-circuiting both the inner and outer oil passages 50, 51 to each other, with a result that the hydraulic pump P and the hydraulic motor M are positioned in a clutch-off state. On the other hand, when the oil pressure of the inner oil passage 50 is increased, the spool valve body 131 is pushed to the plug body 132 side by the oil pressure of the inner oil passage 50 to allow the annular groove 134 and the horizontal holes 133 not to be communicated to each other for preventing short-circuiting between both the oil passages 50, 51, with a result that the hydraulic pump P and the hydraulic motor M are positioned in a clutch-on state.

The present invention is not limited to the above-described embodiment and many changes in design can be made without departing from the scope of the present invention.

For example, in the clutch valve 78 shown in FIG. 7, a through-hole communicating the oil chamber 102 to the inner oil passage 50 may be provided in the piston valve 99 in place of the discharge port 101 for short-circuiting the inner oil passage 50 and the outer oil passage 51 to each other upon opening the valve body 106.

According to the first feature of the present invention, there is provided an automatic clutch device for a hydrostatic continuously variable transmission, which includes a clutch valve, provided between the high pressure oil passage and the low pressure oil passage or a discharge port connected to an oil reservoir, for switching a valve position between a valve opening position in which the high pressure oil passage and the low pressure oil passage or the discharge port connected to the oil reservoir are communicated to each other and a valve closing position in which they are cut-off from each other. The clutch valve is applied with an oil pressure of the low pressure oil passage for biasing the clutch valve in the valve closing direction. An oil pressure governor, for increasing the oil pressure of the low pressure oil passage, is applied to the clutch valve linearly with an input rotational speed of the hydraulic pump and the oil pressure governor being connected to the clutch valve. Accordingly, the clutch valve can be automatically operated in accordance with an input rotational speed of the hydraulic pump by making direct use of an oil pressure of the inner oil passage. This is advantageous in eliminating any special actuator and in simplifying and miniaturizing the structure, resulting in a significantly reduced cost.

According to the second feature of the present invention, the clutch valve is applied with an oil pressure of the high pressure oil passage in the valve opening direction when the clutch valve is closed. The clutch valve is opened when the oil pressure of the high pressure oil passage is increased to exceed the oil pressure of the low pressure oil passage by a specified value or more. As a result, it becomes possible to release an excessive oil pressure from the high pressure oil passage by the clutch valve upon an excessive load of the hydraulic pump. This is advantageous in relaxing a torque shock and in protecting the transmission system and improving riding comfortability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An automatic clutch device for a hydrostatic continuously variable transmission in which a hydraulic pump and a hydraulic motor are in communication with each other through a low pressure oil passage and a high pressure oil passage, and an oil supply passage connected to an oil supply pump is connected to said low pressure oil passage and said high pressure oil passage through a first check valve and a second check valve, respectively, said automatic clutch device, comprising:

a clutch valve operatively positioned for communicating oil from said high pressure oil passage and at least one of said low pressure oil passage and a discharge port connected to an oil reservoir, for switching a valve position between a valve opening position in which said high pressure oil passage and at least one of said low pressure oil passage and said discharge port connected to said oil reservoir are communicated to each other and a valve closing position in which they are cut-off from each other, said clutch valve being applied with an oil pressure of said low pressure oil passage for biasing said clutch valve in the valve closing direction; and an oil pressure governor for linearly increasing the oil pressure of said low pressure oil passage applied to said clutch valve with an input rotational speed of said hydraulic pump, said oil pressure governor being in communication with said clutch valve.

2. The automatic clutch device for a hydrostatic continuously variable transmission according to claim 1, wherein said clutch valve is applied with an oil pressure of said high pressure oil passage in the valve opening direction when said clutch valve is closed; and said clutch valve is opened when the oil pressure of said high pressure oil passage is increased to exceed the oil pressure of said low pressure oil passage by a predetermined value.

3. The automatic clutch device for a hydrostatic continuously variable transmission according to claim 1, wherein said first check valve is a ball valve being selectively opened for permitting oil to be supplied to said low pressure oil passage when the oil within said low pressure oil passage is reduced below a predetermined pressure.

4. The automatic clutch device for a hydrostatic continuously variable transmission according to claim 1, wherein said second check valve is a ball valve being selectively opened for permitting oil to be supplied to said high pressure oil passage when the oil within said high pressure oil passage is reduced below a predetermined pressure.

5. The automatic clutch device for a hydrostatic continuously variable transmission according to claim 1, wherein said clutch valve includes a valve piston and a plug body, said valve piston being slidably mounted within a cylinder block in a range from the low pressure oil passage to the high pressure oil passage with a first end of said valve piston being disposed adjacent to said low pressure oil passage, said plug body being fixed within said cylinder block and disposed adjacent to a second end of said valve piston, said clutch valve being operative connected between said hydraulic pump and said hydraulic motor for selectively cutting off and restarting an oil pressure transmission of the hydraulic pump and the hydraulic motor.

6. The automatic clutch device for a hydrostatic continuously variable transmission according to claim 5, and further including an oil chamber formed adjacent to said valve piston and being in selective communication with an oil reservoir through said discharge port.

7. The automatic clutch device for a hydrostatic continuously variable transmission according to claim 6, and further including a through hole disposed in said plug body and a valve seat for providing communication from said oil chamber to said through hole, a retainer being disposed with said valve seat and being biased to be positioned between said valve piston and said plug body and a valve body disposed between said retainer and said valve seat, said valve body being smaller in diameter relative to a diameter of the valve piston, wherein pressure below a predetermined pressure in said low pressure oil passage enables the biased retainer to release said valve body from the valve seat for releasing oil pressure from the high pressure oil passage to said discharge port.

8. The automatic clutch device for a hydrostatic continuously variable transmission according to claim 6, and further including a through hole disposed in said plug body and a valve seat for providing communication from said oil chamber to said through hole, a retainer being disposed with said valve seat and being biased to be positioned between said valve piston and said plug body and a valve body disposed between said retainer and said valve seat, said valve body being smaller in diameter relative to a diameter of the valve piston, wherein pressure above a predetermined pressure in said low pressure oil passage imparts movement to the biased retainer to engage said valve body with the valve seat for stopping oil pressure from the high pressure oil passage from being discharged to said discharge port.

9. The automatic clutch device for a hydrostatic continuously variable transmission according to claim 1, wherein said oil pressure governor includes a rocking cylinder supported through a pivot positioned on a rotational shaft of the oil supply pump, said rocking cylinder including a weighted portion disposed on one side thereof for rocking the rocking cylinder when a centrifugal force of the weighted portion is increased linearly with the rotational speed of the hydraulic pump.

10. The automatic clutch device for a hydrostatic continuously variable transmission according to claim 9, and further including a governor oil passage being in communication with said discharge port, a governor valve body being in operative association with said governor oil passage for selectively opening said governor oil passage when the rotational speed of the hydraulic pump operates below a predetermined speed.

11. The automatic clutch device for a hydrostatic continuously variable transmission according to claim 9, and further including a governor oil passage being in communication with said discharge port, a governor valve body being in operative association with said governor oil passage for selectively closing said governor oil passage when the rotational speed of the hydraulic pump operates above a predetermined speed.

12. An automatic clutch device for a hydrostatic continuously variable transmission comprising:

a hydraulic pump;

a hydraulic motor being in communication with said hydraulic pump through a low pressure oil passage and a high pressure oil passage;

an oil supply passage being connected to an oil supply pump and being connected to said low pressure oil passage and said high pressure oil passage through a first check valve and a second check valve, respectively;

a clutch valve operatively disposed relative to said high pressure oil passage, said low pressure oil passage and a discharge port connected to an oil reservoir, said clutch valve being movable for switching a valve position between a valve opening position in which said high pressure oil passage and at least one of said low pressure oil passage and said discharge port connected to said oil reservoir are communicated to each other and a valve closing position in which they are cut-off from each other, said clutch valve being applied with an oil pressure of said low pressure oil passage for biasing said clutch valve in the valve closing direction;

an oil pressure governor for linearly increasing the oil pressure of said low pressure oil passage applied to said clutch valve with an input rotational speed of said hydraulic pump, said oil pressure governor being in communication with said clutch valve; and a throttling valve operatively connected to said oil supply pump and said oil pressure governor for controlling the supply of oil therefrom.

13. The automatic clutch device for a hydrostatic continuously variable transmission according to claim 12, wherein said clutch valve is applied with an oil pressure of said high pressure oil passage in the valve opening direction when said clutch valve is closed; and said clutch valve is opened when the oil pressure of said high pressure oil passage is increased to exceed the oil pressure of said low pressure oil passage by a predetermined value.

14. The automatic clutch device for a hydrostatic continuously variable transmission according to claim 12, wherein said first check valve is a ball valve being selectively opened for permitting oil to be supplied to said low pressure oil passage when the oil within said low pressure oil passage is reduced below a predetermined pressure.

15. The automatic clutch device for a hydrostatic continuously variable transmission according to claim 12, wherein said second check valve is a ball valve being selectively opened for permitting oil to be supplied to said high pressure oil passage when the oil within said high pressure oil passage is reduced below a predetermined pressure.

16. The automatic clutch device for a hydrostatic continuously variable transmission according to claim 12, wherein said clutch valve includes a valve piston and a plug body, said valve piston being slidably mounted within a cylinder block in a range from the low pressure oil passage to the high pressure oil passage with a first end of said valve piston being disposed adjacent to said low pressure oil passage, said plug body being fixed within said cylinder block and disposed adjacent to a second end of said valve piston, said clutch valve being operative connected between said hydraulic pump and said hydraulic motor for selectively cutting off and restarting an oil pressure transmission of the hydraulic pump and the hydraulic motor.

17. The automatic clutch device for a hydrostatic continuously variable transmission according to claim 16, and further including an oil chamber formed adjacent to said valve piston and being in selective communication with an oil reservoir through said discharge port.

18. The automatic clutch device for a hydrostatic continuously variable transmission according to claim 17, and further including a through hole disposed in said plug body and a valve seat for providing communication from said oil chamber to said through hole, a retainer being disposed with said valve seat and being biased to be positioned between said valve piston and said plug body and a valve body disposed between said retainer and said valve seat, said valve body being smaller in diameter relative to a diameter of the valve piston, wherein pressure below a predetermined pressure in said low pressure oil passage enables the biased retainer to release said valve body from the valve seat for releasing oil pressure from the high pressure oil passage to said discharge port.

19. The automatic clutch device for a hydrostatic continuously variable transmission according to claim 17, and further including a through hole disposed in said plug body and a valve seat for providing communication from said oil chamber to said through hole, a retainer being disposed with said valve seat and being biased to be positioned between said valve piston and said plug body and a valve body disposed between said retainer and said valve seat, said valve body being smaller in diameter relative to a diameter of the valve piston, wherein pressure above a predetermined pressure in said low pressure oil passage imparts movement to the biased retainer to engage said valve body with the valve seat for stopping oil pressure from the high pressure oil passage from being discharged to said discharge port.

20. The automatic clutch device for a hydrostatic continuously variable transmission according to claim 12, wherein said oil pressure governor includes a rocking cylinder supported through a pivot positioned on a rotational shaft of the oil supply pump, said rocking cylinder including a weighted portion disposed on one side thereof for rocking the rocking cylinder when a centrifugal force of the weighted portion is increased linearly with the rotational speed of the hydraulic pump.

21. The automatic clutch device for a hydrostatic continuously variable transmission according to claim 20, and further including a governor oil passage being in communication with said discharge port, a governor valve body being in operative association with said governor oil passage for selectively opening said governor oil passage when the rotational speed of the hydraulic pump operates below a predetermined speed.

22. The automatic clutch device for a hydrostatic continuously variable transmission according to claim 20, and further including a governor oil passage being in communication with said discharge port, a governor valve body being in operative association with said governor oil passage for selectively closing said governor oil passage when the rotational speed of the hydraulic pump operates above a predetermined speed.

* * * * *